United States Patent [19]

Fages et al.

[11] Patent Number: 5,022,663
[45] Date of Patent: Jun. 11, 1991

[54] METAL GASKET OR JOINT PROVIDED WITH AN EXTREMELY HIGH UNIT-AREA PRESSURE

[75] Inventors: Jean Fages, Pierrelatte; Raymond de Villepoix, Donzere; Claude Abbes, Saint Etienne; Christian Rouaud, Bourg Saint Andeol, all of France

[73] Assignee: Commissariat a L' Energie Atomique, Paris, France

[21] Appl. No.: 398,982

[22] Filed: Aug. 28, 1989

[30] Foreign Application Priority Data

Sep. 8, 1988 [FR] France ................ 88 11727

[51] Int. Cl.⁵ ............................................. F16J 15/08
[52] U.S. Cl. ............................ 277/236; 277/207 A; 277/210
[58] Field of Search ............... 277/236, 207 A, 207 R, 277/210, 205

[56] References Cited

U.S. PATENT DOCUMENTS

| | | | |
|---|---|---|---|
| 3,188,100 | 6/1965 | Delgado | 277/207 |
| 3,325,892 | 6/1967 | Delgado | |
| 3,345,078 | 10/1967 | Bialkowski | 277/207 |
| 3,432,177 | 3/1969 | Colwell | 277/207 |
| 4,114,907 | 9/1978 | Abbes et al. | 277/236 |
| 4,445,694 | 5/1984 | Flaherty | 277/236 |
| 4,477,057 | 10/1984 | Friess | 277/236 |
| 4,561,662 | 12/1985 | de Villepoix et al. | 277/236 |
| 4,603,892 | 8/1986 | Abbes et al. | 277/236 |

FOREIGN PATENT DOCUMENTS 0148088 10/1985 France .

*Primary Examiner*—William A. Cuchlinski, Jr.
*Assistant Examiner*—Daniel G. DePumpo
*Attorney, Agent, or Firm*—Oblon, Spivak, McClelland, Maier & Neustadt

[57] ABSTRACT

So as to embody an assembly whose imperviousness is obtained with slight gripping power and may be kept at high pressure and at a high temperature, the invention concerns proposing a gasket or joint which includes an elastic metal core with a circular section and at least one external casing made of a hard metal. The casing comes and takes support on the flanges of the assembly by projecting parts with a triangular section and having an annular surface in contact with the flanges whose width is at the most equal to about 0.05 mm once the gripping power has been applied.

5 Claims, 1 Drawing Sheet

METAL GASKET OR JOINT PROVIDED WITH AN EXTREMELY HIGH UNIT-AREA PRESSURE

BACKGROUND OF THE INVENTION

1. Field of the Invention

The invention concerns a metal gasket or joint whose original design provides it with an extremely high unit-area pressure for a relatively low gripping power.

2. Discussion of the Background

Having regard to their insensitivity to corrosive fluid, their sound behaviour at high and low temperatures and their long-time strength, metal gaskets are used in a large number of applications in, for example, the chemical, petroleum, nuclear, space and automobile fields, this list being in no way restrictive.

The quality of the imperviousness procured by a gasket depends in particular on the unit-area pressure P developed between the contact surfaces of the gasket and the flanges of the assembly in which this gasket is placed. During the initial tightening of the assembly, the unit-area pressure needs to be sufficient so as to allow for adaptation of the gasket to the surface roughness of the flanges. Moreover, when the this assembly is in service, in installation, the following equation R must always be satisfied:

$$P_{sp} > m \times p$$

where m represents the gripping coefficient of the gasket, namely the ratio (always greater than 1) between the minimum gripping pressure of the gasket and the pressure of the internal fluid when the installation is in service, and where P represents the pressure of the internal fluid when the installation is in service.

Thus, it is clear that the value of the unit-area pressure $P_{sp}$ needs to be as high as possible so that the assembly remains sealed to high internal pressure P.

A further significant characteristic of the gaskets concerns the gripping power required to be applied to the assembly so as to obtain imperviousness. In a large number of applications, it is essential that this force remains relatively slight. This is particularly the case when the assembly is not very accessible and renders difficult the handling of gripping implements (in the nuclear industry, for example) and when the assemblings with materials presenting sophisticated characteristics need to be lightened and do not support high forces (in the aerial navigation or space industries, for example).

In the prior art, the metal gaskets, which are designed so as to be put in place with a relatively slight gripping power, still comprise in the parts in contact with the surfaces opposite the flanges a relatively thick outer ductile metal casing or covering. When a relatively slight gripping power is applied, this metal deforms beyond its limit of elasticity and ensures imperviousness of the assembly. Some of the metal gaskets having this configuration include solid joints with a K, V or U-shaped section, as well as Helicoflex joints (registered trade mark), which are toric-shaped joints comprising an elastic metal core constituted by a spring with contiguous spires and one or more metal casings, the outer casing being made of a ductile metal.

However, the presence of a ductile metallic casing in the parts of these joints in contact with the surfaces of the flanges has the effect of significantly increasing the contact surfaces of the gasket and the flanges at the time the gripping power is applied. The unit-area pressure developed between these surfaces thus remains relatively reduced. Accordingly, having regard to the equation mentioned above which must satisfy the unit-area pressure so as to ensure satisfactory imperviousness of the assembly in service, this type of gasket may not be used when the pressure of the internal fluid is too high.

Furthermore, the mechanical properties of the ductile metals constituting the outer casing of these existing gaskets are altered when the temperature becomes too high.

This state of the technique is illustrated particularly by the document FR-A-2 557 662 which concerns a Helicoflex gasket (registered trademark) whose outer casing made of a ductile material comprises a projecting part with a triangular section which disappears completely when the gripping power is applied to the assembly.

This examination of the state of the technique shows that there currently exists no metal gasket for which imperviousness may be obtained by applying a relatively slight gripping power (about 10 daN/mm, for example) and which needs to be suitable so as to guarantee imperviousness of the assembly at high pressure and/or at high temperatures.

SUMMARY OF THE INVENTION

The precise object of the present invention is to provide a new type of metal gasket whose original design enables it to guarantee imperviousness of the assembly for a moderate gripping power and to retain this imperviousness at high pressure and at a high temperature.

According to the invention, this result is obtained by using a metal gasket comprising an elastic metal core having as a section, when said core is at rest, the shape of a circle, and at least one outer metal casing in which the metal core is embedded and on which two diametrical projecting parts are formed whose peripheral edges are suitable for coming into sealed contact with two opposite surfaces under the effect of a determined gripping power, wherein the outer casing comprising the projecting parts is made of a hard metal material working extremely locally in the plastics field when said gripping power is applied, and wherein the peripheral edge of each of the projecting parts has a width equal at the most to about 0.05 mm once said gripping power has been applied.

In a gasket embodied in this way, the contact surface between the gasket and the flanges of the assembly is virtually reduced to one circumferential line, which makes it possible to guarantee imperviousness of the assembly for a relatively slight gripping power, even though the outer casing of the gasket is made of a hard metal. Furthermore, the significant reduction of the contact surface with respect to existing gaskets makes it possible, for a given gripping power, to obtain a much higher (for example, a multiple of 10) unit-area pressure. Accordingly, the assembly is able to support a fluid pressure increased according to the same proportions. In addition, as imperviousness is embodied by using a hard metal working extremely locally beyond its limit of elasticity, this enables the gasket to withstand extremely high temperatures (about 800° C.), given the fact that the mechanical properties of the outer casing thus constituted are not affected adversely in the rest of the section.

The hard metal of the outer casing is preferably selected from the group comprising stainless steel, nickel, tantalum and inconel.

Advantageously, the projecting parts have in section a shape which is approximately triangular and whose height is equal at the most to about 0.06 mm, these projecting parts being embodied in the outer casing by having material removed.

According to a further advantageous characteristic of the invention, the outer casing comprises a peripheral opening orientated towards the outside of the gasket and is offset, for example, by an angle of between about 15° and about 40° with respect to a median plane of the gasket. This characteristic enables the gasket to be precisely positioned when said gasket needs to be housed in a throat formed in one of the flanges in contact with the outer peripheral edge of this throat.

BRIEF DESCRIPTION OF THE DRAWINGS

There now follows an example of the embodiment of a metal gasket according to the invention, said example being given by way of example in no way restrictive accompanied by the annexed drawings in which.

DESCRIPTION OF THE PREFERRED EMBODIMENTS

Figure 1:
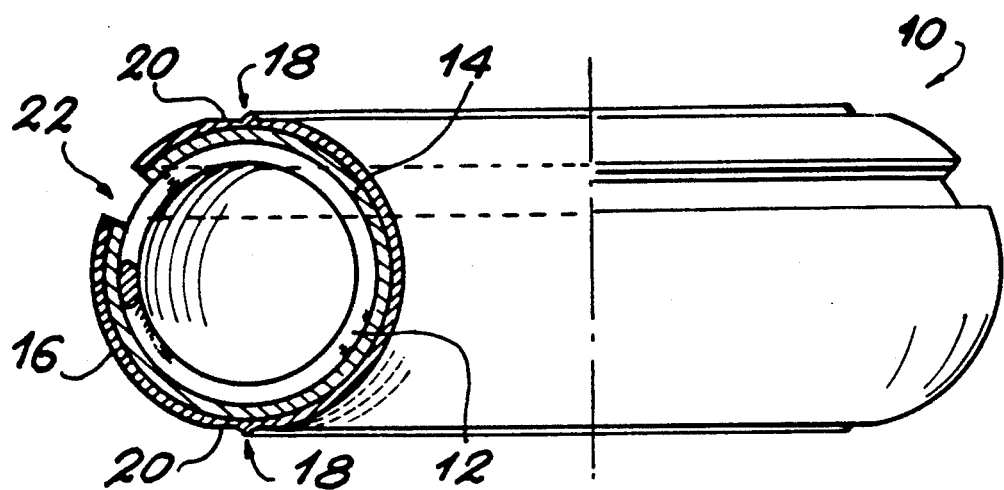
FIG. 1 is a transversal cutaway view representing one part of a metal gasket embodied according to the invention.

The metal gasket according to the invention is denoted generally by the reference 10 on FIG. 1. In a known way, it includes an elastic metal core exhibiting, when at rest, the shape of a torus. This elastic core is constituted by a metal helical spring 12 with contiguous spires closed back onto itself. The section of the wire constituting this spring may be any shape and in particular may be circular, rectangular or like a segment of a circle. This central metallic core provides the gasket with its elasticity.

In the embodiment represented, the spring 12 is embedded in a first casing 14, itself embedded in an outer casing 16. The first casing 14 is made of a metallic material whose main function is to distribute in a known way the load at each spire top of the spring. On the other hand, the outer casing 16 is embodied according to the invention in a totally original way, said casing now being described by successively referring to FIGS. 1 and 2.

Instead of being made of a ductile metallic material as in existing gaskets, the outer casing 16 according to the invention is basically made of a hard metallic material. Advantageously, this material may be stainless steel, nickel, tantalum or inconel.

Furthermore, two projecting parts 18 are embodied at diametrical locations over the entire periphery of the outer casing 16, these locations being disposed symmetrically with respect to the median plane of symmetry of the gasket. Thus, when said gasket is placed between the two flanges of an assembly, it comes and takes support on the opposite faces of the flanges solely via the extremities of the projecting parts 18, as shown on FIG. 3.

The two projecting parts 18 of the gasket 10 are perfectly identical and their shapes and dimensions are now to be described in detail with reference to FIG. 2.

As shown on this figure, each of the projecting parts 18 has as a section the shape of an isoceles triangle whose angle at the top is approximately a right angle and whose height h is equal at the most to about 0.06 mm and is at least equal to about 0.04 mm. Advantageously and as clearly shown on FIG. 1, the projecting parts 18 are directly embodied by machining with removal of material from the thickness of the outer casing 16.

Figure 2:
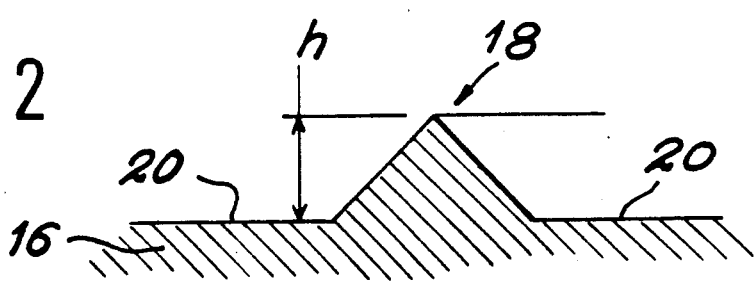
FIG. 2 is a transversal cutaway view on a larger scale representing one of the projecting parts of the gasket of FIG. 1.

As shown also on FIG. 2, this machining is effected so that the projecting parts 18 project beyond a flat surface 20 orientated parallel to the median plane of symmetry of the gasket.

Moreover, FIG. 1 shows that, instead of being open along the outer periphery of the gasket (this generally being the case with existing gaskets), the casings 14 and 16 comprise peripheral openings 22 orientated towards the outside of the gasket, but are offset with respect to the median plane of symmetry of said gasket. More precisely, the edges of the openings 22 of the casings 14 and 16 of the gasket are advantageously respectively offset by about 15° and about 40° with respect to said median plane of symmetry.

Figure 3:
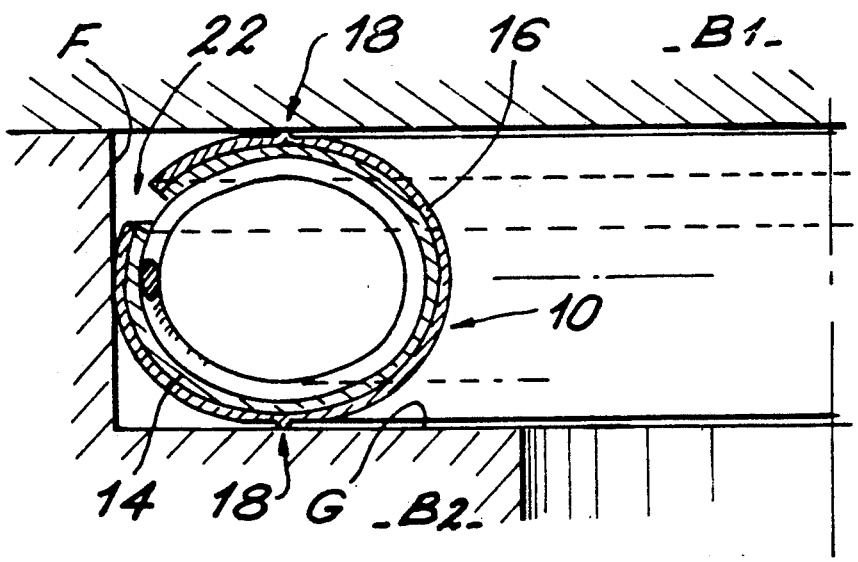
FIG. 3 is a transversal cutaway view representing the gasket of FIG. 1 after said gasket has been mounted and tightened in an assembly.

FIG. 3 shows the gasket 10 according to the invention placed in an assembly principally comprising two flanges B1 and B2, represented solely partially, and any known type of tighening means (not represented). One of the flanges (B2 on FIG. 3) comprises a throat G in which the gasket 10 is housed and whose depth is slightly less than the thickness of said gasket.

The materials constituting the flanges B1 and B2 are adapted to the materials constituting the outer casing 16 of the gasket so as to avoid marking phenomena. In particular, the hardness of the materials in which the flanges are embodied is always greater than that of the material in which the outer casing 16 of the joint is embodied.

By way of example in no way restrictive, if the outer casing 16 of the gasket is made of stainless steel with a hardness of HV 150, the flanges B1 and B2 may be made of burnished stainless steel with a hardness of HV 200. Similarly, treated inconel flanges with a hardness of HV 300 are used if the outer casing 16 of the gasket is made of inconel 600 with a hardness of HV 170.

As shown on FIG. 3, when the gasket 10 is placed in the throat G of the flange B2 and a relatively slight gripping power, for example of about 10 daN/mm, is applied between the flanges B1 and B2, the hardness of the material constituting the outer casing 16 of the gasket enables said gasket to retain its projecting parts 18. Under the effect of caulking following application of the gripping power, the height h of the projecting parts is reduced by about 0.02 mm and the width of the outer peripheral edge of each of the projecting parts is between 0.02 mm and 0.05 mm.

Throughout the period of use of the assembly, the contact surfaces between the gasket and the flat surfaces opposite the flanges B1 and B2 are thus limited to an annular surface whose width is at the most equal to about 0.05 mm and at the least equal to about 0.02 mm. Thus for a gripping power of about 10 daN/mm, the unit-area pressure developed on the surfaces in contact between the gasket and the flanges is about 200 daN/mm$^2$ if these surfaces in contact have a width of about 0.05 mm. Such a unit-area pressure makes it possible to guarantee imperviousness of the assembly operating for extremely high internal fluid pressures.

Furthermore, the nature of the metal constituting the outer casing 16 for the gripping pressure of said assembly makes it possible to keep this material extremely locally above its limit of elasticity.

Accordingly, the mechanical properties of this material in the remainder of the section are not altered at extremely high temperatures, such as those approaching 800° C. The metal gasket according to the invention thus makes it possible to also guarantee perfect imperviousness, even at very high temperatures. Tests at 800° C. carried out on a gasket according to the invention comprising an outer inconel 600 coating associated with inconel 718 flanges have confirmed that the height of the projecting parts remains virtually unchanged at this temperature.

Compared with metal gaskets with a K, V, U or C-shaped section whose non-symmetrical section has the effect of provoking a slight radial sliding and a slight rotation of the parts of the gaskets in contact with the flanges at the time of tightening, the gasket according to the invention also has the advantage of not resulting in any radial stray displacement of the projecting parts 18 with respect to the flanges owing to the symmetry exhibited as a section by the elastic core of the gasket.

With reference again to FIG. 3, it is essential to mention that the particular orientation of the openings 22 of the casings 14 and 16 of the previously described gasket enables the outer peripheral edge of the gasket to be perfectly supported on the outer flank F of the throat G in which this gasket is housed by virtue of the effect of a high internal pressure acting on said gasket. In fact, the position of the opening 22 makes it possible to determine extremely accurately the outer diameter of the gasket with respect to the outer diameter of the throat where a gasket is used under high pressure.

Such a result would not be obtained with existing gaskets in which the opening of the casings is formed at the median plane of symmetry of the gasket, so that the support of the gasket on the outer flank of the throat is provided by the edges of this opening. In addition, the internal pressure would then risk causing the spring 12 to slide outside into the casings, which would lead to a displacement of the reaction force on the contact surfaces between the gasket and the flanges and could lead to a leak being created.

Of course, the invention is not restricted to the embodiment described above by way of example, but covers all its variants. In particular, the gasket according to the invention may assume any shape (rectangular, circular, oblong, triangular, oval, etc) depending on the application envisaged. Moreover, the helical spring constituting the elastic core of the gasket in the embodiment example described may in certain cases be replaced by a metal tube. The internal casing may then be suppressed.

What is claimed is:

1. Metal gasket which comprises:
   an elastic metal core casing presenting when at rest a section with the shape of a circle,
   a spring embedded in said metal core casing, and
   at least one outer metallic casing in which is embedded the metal core casing and on which are formed two diametrical projecting portions symmetrically disposed with respect to a median plane of symmetry of said gasket, said projecting portions having peripheral edges including means for sealed contact with two opposite surfaces under the effect of a predetermined gripping power, wherein the outer casing comprises a metallic material and wherein a peripheral edge of each of the projecting sections has a width of at most about 0.05 mm after said gripping power has been applied wherein the outer casing and metal core casing each have a peripheral opening oriented towards an outside portion of the gasket which is offset with respect to said median plane of symmetry of said gasket by an angle of between about 15° and about 40°.

2. Gasket according to claim 1, wherein the hard metallic material of the outer casing is selected from the group comprising stainless steel, nickel, tantalum and inconel.

3. Gasket according to claim 1, wherein the projecting sections have a section with roughly a triangular shape whose height is at the most equal to about 0.06 mm.

4. Gasket according to claim 1, wherein the projecting sections are formed on the outer casing by removing a certain amount of material.

5. Gasket according to claim 1, wherein the projecting sections are kept functioning at high pressure and at a high temperature and ensure imperviousness by retaining the high unit-area pressure obtained on tightening of the assembly.

* * * * *